(12) United States Patent
Duesel, Jr.

(10) Patent No.: US 8,741,101 B2
(45) Date of Patent: Jun. 3, 2014

(54) LIQUID CONCENTRATOR

(75) Inventor: Bernard F. Duesel, Jr., Goshen, NY (US)

(73) Assignee: Heartland Technology Partners LLC, St. Louis, MO (US)

(*) Notice: Subject to any disclaimer, the term of this patent is extended or adjusted under 35 U.S.C. 154(b) by 0 days.

(21) Appl. No.: 13/548,866

(22) Filed: Jul. 13, 2012

(65) Prior Publication Data

US 2014/0014278 A1 Jan. 16, 2014

(51) Int. Cl.
*C02F 1/04* (2006.01)
*C02F 9/02* (2006.01)
*B01D 1/16* (2006.01)

(52) U.S. Cl.
USPC .......... 159/4.01; 202/163; 202/236; 210/150; 210/194; 261/78.2; 261/79.2; 96/275; 96/277; 96/312

(58) Field of Classification Search
CPC .............. C02F 1/04; C02F 1/048; C02F 9/00; B01D 1/14; B01D 1/16; B01D 1/30
USPC .............. 95/271; 96/265, 275, 277, 301, 306, 96/308, 312, 313; 159/4.01, 4.05, 31; 202/163, 232, 236; 203/12; 210/805, 210/150, 151, 194; 261/77, 78.2, 79.2
See application file for complete search history.

(56) References Cited

U.S. PATENT DOCUMENTS

| | | | |
|---|---|---|---|
| 1,894,744 A | * | 1/1933 | Hawley .............................. 96/237 |
| 2,372,846 A | | 4/1945 | Frederick et al. |
| 2,387,818 A | | 10/1945 | Wethly |
| 2,468,455 A | | 4/1949 | Metziger |
| 2,560,226 A | | 7/1951 | Joos et al. |
| 2,619,421 A | | 11/1952 | Greenfield |
| 2,651,647 A | | 9/1953 | Greenfield |

(Continued)

FOREIGN PATENT DOCUMENTS

| CL | 757-2004 | 5/2007 |
|---|---|---|
| DE | 556 455 C | 8/1932 |

(Continued)

OTHER PUBLICATIONS

LFG Specialties, LLC, Waste Heat Leachate Evaporator System, Jan. 14, 2011.

(Continued)

*Primary Examiner* — Nina Bhat
*Assistant Examiner* — Jonathan Miller
(74) *Attorney, Agent, or Firm* — Marshall, Gerstein & Borun LLP

(57) ABSTRACT

A liquid concentrator having an evaporator assembly and a cyclonic separator includes features designed to improve the performance of the liquid concentrator. A settling chamber is separated from a sump of the cyclonic separator. A liquid inlet opening into a mixing chamber of the evaporator injects wastewater at low pressures. Features to aid in the cleaning of the liquid concentrator include easy open doors and clean water injection ports for cleaning interior portions of the liquid concentrator. In one feature a settling tank is disposed below the cyclonic separator and has a width that is larger than the width of the cyclonic separator. In another variation, the cyclonic separator has a tubular body with an interior that is substantially unobstructed between an inlet from the evaporator assembly and an exhaust outlet. In yet another variation, the cyclonic separator has an upper chamber that is separated from a lower chamber.

15 Claims, 5 Drawing Sheets

(56) References Cited

U.S. PATENT DOCUMENTS

| | | | |
|---|---|---|---|
| 2,658,349 | A | 11/1953 | Keller |
| 2,658,735 | A | 11/1953 | Ybarrondo |
| 2,721,065 | A | 10/1955 | Ingram |
| 2,790,506 | A | 4/1957 | Vactor |
| 2,867,972 | A | 1/1959 | Hokderreed et al. |
| 2,879,838 | A | 3/1959 | Flynt et al. |
| 2,890,166 | A | 6/1959 | Heinze |
| 2,911,421 | A | 11/1959 | Greenfield |
| 2,911,423 | A | 11/1959 | Greenfield |
| 2,979,408 | A | 4/1961 | Greenfield |
| 2,981,250 | A | 4/1961 | Steward |
| 3,060,921 | A | 10/1962 | Luring et al. |
| 3,076,715 | A | 2/1963 | Greenfield |
| 3,203,875 | A | 8/1965 | Harris |
| 3,211,538 | A | 10/1965 | Gross et al. |
| 3,212,235 | A | 10/1965 | Markant |
| 3,251,398 | A | 5/1966 | Greenfield |
| 3,268,443 | A | 8/1966 | Cann |
| 3,284,064 | A | 11/1966 | Kolm et al. |
| 3,299,651 | A | 1/1967 | McGrath |
| 3,304,991 | A | 2/1967 | Greenfield |
| 3,306,039 | A | 2/1967 | Peterson |
| 3,323,575 | A | 6/1967 | Greenfield |
| 3,349,546 | A * | 10/1967 | Rogers ............... 96/256 |
| 3,405,918 | A | 10/1968 | Calaceto et al. |
| 3,406,498 | A * | 10/1968 | Wisting ............... 96/249 |
| 3,432,399 | A | 3/1969 | Schutt |
| 3,539,549 | A | 11/1970 | Greenfield |
| 3,546,851 | A * | 12/1970 | Hardison et al. ............... 96/313 |
| 3,578,892 | A | 5/1971 | Wilkinson |
| 3,601,374 | A | 8/1971 | Wheeler |
| 3,638,924 | A | 2/1972 | Calaceto et al. |
| 3,704,570 | A | 12/1972 | Gardenier |
| 3,713,786 | A | 1/1973 | Umstead |
| 3,716,458 | A | 2/1973 | Greenfield et al. |
| 3,730,673 | A | 5/1973 | Straitz, III |
| 3,743,483 | A | 7/1973 | Shah |
| 3,754,869 | A | 8/1973 | Van Raden |
| 3,756,580 | A | 9/1973 | Dunn |
| 3,756,893 | A | 9/1973 | Smith |
| 3,762,893 | A | 10/1973 | Larsen |
| 3,782,300 | A | 1/1974 | White et al. |
| 3,789,902 | A | 2/1974 | Shah et al. |
| 3,826,096 | A | 7/1974 | Hrusch |
| 3,838,974 | A | 10/1974 | Hemsath et al. |
| 3,838,975 | A | 10/1974 | Tabak |
| 3,840,002 | A | 10/1974 | Douglas et al. |
| 3,855,079 | A | 12/1974 | Greenfield et al. |
| 3,870,585 | A | 3/1975 | Kearns et al. |
| 3,876,490 | A | 4/1975 | Tsuruta |
| 3,880,756 | A | 4/1975 | Raineri et al. |
| 3,898,134 | A | 8/1975 | Greenfield et al. |
| 3,901,643 | A | 8/1975 | Reed et al. |
| 3,915,620 | A | 10/1975 | Reed |
| 3,917,508 | A | 11/1975 | Greenfield et al. |
| 3,925,148 | A | 12/1975 | Erwin |
| 3,944,215 | A | 3/1976 | Beck |
| 3,945,331 | A | 3/1976 | Drake et al. |
| 3,947,215 | A | 3/1976 | Peterson et al. |
| 3,947,327 | A | 3/1976 | Greenfield et al. |
| 3,950,230 | A | 4/1976 | Greenfield et al. |
| 3,994,671 | A | 11/1976 | Straitz, III |
| 4,001,077 | A | 1/1977 | Kemper |
| 4,007,094 | A | 2/1977 | Greenfield et al. |
| 4,012,191 | A | 3/1977 | Lisankie et al. |
| 4,013,516 | A | 3/1977 | Greenfield et al. |
| 4,017,275 | A * | 4/1977 | Hodgson et al. ............... 95/271 |
| 4,026,682 | A | 5/1977 | Pausch |
| 4,036,576 | A | 7/1977 | McCracken |
| 4,070,423 | A | 1/1978 | Pierce |
| 4,079,585 | A | 3/1978 | Helleur |
| 4,080,883 | A | 3/1978 | Zink et al. |
| 4,092,908 | A | 6/1978 | Straitz, III |
| 4,118,173 | A | 10/1978 | Shakiba |
| 4,119,538 | A | 10/1978 | Yamauchi et al. |
| 4,140,471 | A | 2/1979 | Straitz, III et al. |
| 4,154,570 | A | 5/1979 | Schwartz |
| 4,157,239 | A | 6/1979 | Reed |
| 4,181,173 | A | 1/1980 | Pringle |
| 4,185,685 | A | 1/1980 | Giberson |
| 4,198,198 | A | 4/1980 | Straitz, III |
| 4,227,897 | A | 10/1980 | Reed |
| 4,230,536 | A | 10/1980 | Sech |
| 4,257,746 | A | 3/1981 | Wells |
| 4,259,185 | A | 3/1981 | Mixon |
| 4,264,826 | A | 4/1981 | Ullmann |
| 4,270,974 | A | 6/1981 | Greenfield et al. |
| 4,276,115 | A | 6/1981 | Greenfield et al. |
| 4,285,578 | A | 8/1981 | Yamashita et al. |
| 4,300,924 | A | 11/1981 | Coyle |
| 4,306,858 | A | 12/1981 | Simon |
| 4,336,101 | A | 6/1982 | Greenfield et al. |
| 4,346,660 | A | 8/1982 | McGill |
| RE31,185 | E | 3/1983 | Greenfield et al. |
| 4,430,046 | A | 2/1984 | Cirrito |
| 4,432,914 | A | 2/1984 | Schifftner |
| 4,440,098 | A | 4/1984 | Adams |
| 4,445,464 | A | 5/1984 | Gerstmann et al. |
| 4,445,842 | A | 5/1984 | Syska |
| 4,450,901 | A | 5/1984 | Janssen |
| 4,485,746 | A | 12/1984 | Erlandsson |
| 4,496,314 | A | 1/1985 | Clarke |
| 4,514,194 | A * | 4/1985 | Jarvenpaa ............... 95/218 |
| 4,518,458 | A | 5/1985 | Greenfield et al. |
| 4,538,982 | A | 9/1985 | McGill et al. |
| 4,583,936 | A | 4/1986 | Krieger |
| 4,608,120 | A | 8/1986 | Greenfield et al. |
| 4,613,409 | A | 9/1986 | Volland |
| 4,648,973 | A | 3/1987 | Hultholm et al. |
| 4,652,233 | A | 3/1987 | Hamazaki et al. |
| 4,658,736 | A | 4/1987 | Walter |
| 4,683,062 | A | 7/1987 | Krovak et al. |
| 4,689,156 | A | 8/1987 | Zibrida |
| 4,693,304 | A | 9/1987 | Volland |
| 4,771,708 | A | 9/1988 | Douglass, Jr. |
| 4,838,184 | A | 6/1989 | Young et al. |
| 4,863,644 | A | 9/1989 | Harrington et al. |
| 4,882,009 | A | 11/1989 | Santoleri et al. |
| 4,890,672 | A | 1/1990 | Hall |
| 4,909,730 | A | 3/1990 | Roussakis et al. |
| 4,913,065 | A | 4/1990 | Hemsath |
| 4,938,899 | A | 7/1990 | Oros et al. |
| 4,952,137 | A | 8/1990 | Schwartz et al. |
| 4,961,703 | A | 10/1990 | Morgan |
| 5,009,511 | A | 4/1991 | Sarko et al. |
| 5,028,298 | A | 7/1991 | Baba et al. |
| 5,030,428 | A | 7/1991 | Dorr et al. |
| 5,032,230 | A | 7/1991 | Shepherd |
| 5,068,092 | A | 11/1991 | Aschauer |
| 5,076,895 | A | 12/1991 | Greenfield et al. |
| 5,132,090 | A | 7/1992 | Volland |
| 5,154,898 | A | 10/1992 | Ajinkya et al. |
| 5,176,798 | A | 1/1993 | Rodden |
| 5,183,563 | A | 2/1993 | Rodden |
| 5,227,017 | A | 7/1993 | Tanaka et al. |
| 5,238,580 | A | 8/1993 | Singhvi |
| 5,279,356 | A | 1/1994 | Bruhn |
| 5,279,646 | A | 1/1994 | Schwab |
| 5,336,284 | A | 8/1994 | Schifftner |
| 5,342,482 | A | 8/1994 | Duesel, Jr. |
| D350,838 | S | 9/1994 | Johnson |
| 5,347,958 | A | 9/1994 | Gordon, Jr. |
| 5,423,979 | A | 6/1995 | Allen |
| 5,460,511 | A | 10/1995 | Grahn |
| 5,484,471 | A | 1/1996 | Schwab |
| 5,512,085 | A | 4/1996 | Schwab |
| 5,527,984 | A | 6/1996 | Stultz et al. |
| 5,585,005 | A | 12/1996 | Smith et al. |
| 5,630,913 | A | 5/1997 | Tajer-Ardebili |
| 5,632,864 | A | 5/1997 | Enneper |
| 5,636,623 | A | 6/1997 | Panz et al. |
| 5,648,048 | A | 7/1997 | Kuroda et al. |
| 5,656,155 | A | 8/1997 | Norcross et al. |
| 5,662,802 | A | 9/1997 | Heins et al. |

(56) References Cited

U.S. PATENT DOCUMENTS

| | | |
|---|---|---|
| 5,695,614 A | 12/1997 | Hording et al. |
| 5,695,643 A | 12/1997 | Brandt et al. |
| 5,735,680 A | 4/1998 | Henkelmann |
| 5,749,719 A | 5/1998 | Rajewski |
| 5,759,233 A | 6/1998 | Schwab |
| 5,810,578 A | 9/1998 | Hystad et al. |
| 5,865,618 A | 2/1999 | Hiebert |
| 5,879,563 A | 3/1999 | Garbutt |
| 5,925,223 A | 7/1999 | Simpson et al. |
| 5,934,207 A | 8/1999 | Echols et al. |
| 5,951,743 A | 9/1999 | Hsieh et al. |
| 5,958,110 A | 9/1999 | Harris et al. |
| 5,968,320 A | 10/1999 | Sprague |
| 5,968,352 A | 10/1999 | Ditzler |
| 6,007,055 A | 12/1999 | Schifftner |
| 6,119,458 A | 9/2000 | Harris et al. |
| 6,149,137 A | 11/2000 | Johnson et al. |
| 6,250,916 B1 | 6/2001 | Philippe et al. |
| 6,276,872 B1 | 8/2001 | Schmitt |
| 6,293,277 B1 | 9/2001 | Panz et al. |
| 6,332,949 B1 | 12/2001 | Beckhaus et al. |
| 6,345,495 B1 | 2/2002 | Cummings |
| 6,383,260 B1 | 5/2002 | Schwab |
| 6,391,100 B1 | 5/2002 | Hogan |
| 6,391,149 B1 | 5/2002 | Calfee et al. |
| 6,402,816 B1 | 6/2002 | Trivett et al. |
| 6,435,860 B1 | 8/2002 | Brookshire et al. |
| 6,468,389 B1 | 10/2002 | Harris et al. |
| 6,485,548 B1 | 11/2002 | Hogan |
| 6,500,216 B1 | 12/2002 | Takayasu |
| 6,616,733 B1 | 9/2003 | Pellegrin |
| 6,632,083 B1 | 10/2003 | Bussman et al. |
| 6,656,250 B1 * | 12/2003 | Listner et al. ............. 95/216 |
| 6,719,829 B1 | 4/2004 | Schwab |
| 6,733,636 B1 | 5/2004 | Heins |
| 6,742,337 B1 | 6/2004 | Hays et al. |
| 6,752,920 B2 | 6/2004 | Harris et al. |
| 6,913,671 B2 | 7/2005 | Bolton et al. |
| 6,919,000 B2 | 7/2005 | Klausner et al. |
| 6,926,757 B2 | 8/2005 | Kalliokoski et al. |
| 6,936,140 B2 | 8/2005 | Paxton et al. |
| 7,037,434 B2 | 5/2006 | Myers et al. |
| 7,069,991 B2 | 7/2006 | Gudmestad et al. |
| 7,073,337 B2 | 7/2006 | Mangin |
| 7,074,339 B1 | 7/2006 | Mims |
| 7,077,201 B2 | 7/2006 | Heins |
| 7,111,673 B2 | 9/2006 | Hugill |
| 7,142,298 B2 | 11/2006 | Nuspliger |
| 7,144,555 B1 | 12/2006 | Squires et al. |
| 7,150,320 B2 | 12/2006 | Heins |
| 7,156,985 B1 | 1/2007 | Frisch |
| 7,166,188 B2 | 1/2007 | Kedem et al. |
| 7,214,290 B2 | 5/2007 | Duesel, Jr. et al. |
| 7,225,620 B2 | 6/2007 | Klausner et al. |
| 7,288,186 B2 | 10/2007 | Harris |
| 7,332,010 B2 | 2/2008 | Steiner |
| 7,402,247 B2 | 7/2008 | Sutton |
| 7,416,172 B2 | 8/2008 | Duesel, Jr. et al. |
| 7,416,177 B2 | 8/2008 | Suzuki et al. |
| 7,424,999 B2 | 9/2008 | Xu et al. |
| 7,428,926 B2 | 9/2008 | Heins |
| 7,438,129 B2 | 10/2008 | Heins |
| 7,442,035 B2 | 10/2008 | Duesel, Jr. et al. |
| 7,459,135 B2 | 12/2008 | Pieterse et al. |
| 7,572,626 B2 | 8/2009 | Frisch et al. |
| 7,591,309 B2 | 9/2009 | Minnich et al. |
| 7,614,367 B1 | 11/2009 | Frick |
| 7,661,662 B2 | 2/2010 | Forstmanis |
| 7,681,643 B2 | 3/2010 | Heins |
| 7,717,174 B2 | 5/2010 | Heins |
| 7,758,819 B2 | 7/2010 | Nagelhout |
| 7,832,714 B2 | 11/2010 | Duesel, Jr. et al. |
| 7,955,419 B2 | 6/2011 | Casella |
| 7,964,018 B2 * | 6/2011 | Kang et al. ............. 95/13 |
| 8,066,844 B2 | 11/2011 | Duesel, Jr. et al. |
| 8,066,845 B2 | 11/2011 | Duesel, Jr. et al. |
| 8,114,287 B2 | 2/2012 | Harris |
| 8,136,797 B2 | 3/2012 | Duesel, Jr. et al. |
| 2001/0013666 A1 | 8/2001 | Nomura et al. |
| 2002/0069838 A1 | 6/2002 | Rautenbach et al. |
| 2003/0104778 A1 | 6/2003 | Liu |
| 2003/0127226 A1 | 7/2003 | Heins |
| 2004/0000515 A1 | 1/2004 | Harris et al. |
| 2004/0031424 A1 | 2/2004 | Pope |
| 2004/0040671 A1 | 3/2004 | Duesel et al. |
| 2004/0045681 A1 | 3/2004 | Bolton et al. |
| 2004/0045682 A1 | 3/2004 | Liprie |
| 2004/0079491 A1 | 4/2004 | Harris et al. |
| 2005/0022989 A1 | 2/2005 | Heins |
| 2005/0074712 A1 | 4/2005 | Brookshire et al. |
| 2005/0230238 A1 | 10/2005 | Klausner et al. |
| 2005/0242036 A1 | 11/2005 | Harris |
| 2005/0279500 A1 | 12/2005 | Heins |
| 2006/0000355 A1 | 1/2006 | Ogura et al. |
| 2006/0032630 A1 | 2/2006 | Heins |
| 2007/0051513 A1 | 3/2007 | Heins |
| 2007/0114683 A1 | 5/2007 | Duesel et al. |
| 2007/0175189 A1 | 8/2007 | Gomiciaga-Pereda et al. |
| 2007/0251650 A1 | 11/2007 | Duesel et al. |
| 2008/0110417 A1 | 5/2008 | Smith |
| 2008/0115361 A1 | 5/2008 | Santini et al. |
| 2008/0173176 A1 | 7/2008 | Duesel et al. |
| 2008/0173590 A1 | 7/2008 | Duesel et al. |
| 2008/0174033 A1 | 7/2008 | Duesel et al. |
| 2008/0213137 A1 | 9/2008 | Frisch et al. |
| 2008/0265446 A1 | 10/2008 | Duesel et al. |
| 2008/0272506 A1 | 11/2008 | Duesel et al. |
| 2008/0277262 A1 | 11/2008 | Harris |
| 2009/0078416 A1 | 3/2009 | Heins |
| 2009/0127091 A1 | 5/2009 | Heins |
| 2009/0294074 A1 | 12/2009 | Forstmanis |
| 2010/0095763 A1 | 4/2010 | Harris |
| 2010/0126931 A1 | 5/2010 | Capeau et al. |
| 2010/0139871 A1 | 6/2010 | Rasmussen et al. |
| 2010/0176042 A1 | 7/2010 | Duesel, Jr. et al. |
| 2010/0224364 A1 | 9/2010 | Heins |
| 2010/0236724 A1 | 9/2010 | Duesel, Jr. et al. |
| 2011/0061816 A1 | 3/2011 | Duesel, Jr. et al. |
| 2011/0083556 A1 | 4/2011 | Duesel, Jr. et al. |
| 2011/0100924 A1 | 5/2011 | Duesel, Jr. et al. |
| 2011/0147195 A1 | 6/2011 | Shapiro et al. |
| 2011/0168646 A1 | 7/2011 | Tafoya |
| 2011/0180470 A1 | 7/2011 | Harris |
| 2011/0240540 A1 | 10/2011 | Harris |
| 2012/0211441 A1 | 8/2012 | Harris |

FOREIGN PATENT DOCUMENTS

| | | |
|---|---|---|
| DE | 1 173 429 B | 7/1964 |
| EP | 0 047 044 A1 | 3/1982 |
| FR | 2 441 817 A1 | 6/1980 |
| GB | 383570 A | 11/1932 |
| GB | 463770 A | 4/1937 |
| JP | 60257801 | 12/1985 |
| JP | 62121687 | 6/1987 |
| JP | 2003/021471 A | 1/2003 |
| WO | WO-96/10544 A2 | 4/1996 |
| WO | WO-2004/022487 A2 | 3/2004 |
| WO | WO-2005/110608 A1 | 11/2005 |
| WO | WO-2008/112793 A1 | 9/2008 |
| WO | WO-2009/071763 A1 | 6/2009 |
| WO | WO-2010/092265 A1 | 8/2010 |
| WO | WO-2011/042693 A2 | 4/2011 |
| WO | WO-2011/050317 A2 | 4/2011 |
| WO | WO-2012/100074 A2 | 7/2012 |

OTHER PUBLICATIONS

"Gas Atomized Venturi Scrubbers," Bionomic Industries, copyright 2008, printed from www.bionomicind.com <http://www.bionomicind.com> on May 25, 2011.

"Waste Heat Recovery Systems," Bionomic Industries, copyright 2008, printed from www.bionomicind.com <http://www.bionomicind.com> on May 25, 2011.

(56) References Cited

OTHER PUBLICATIONS

Bachand et al., "Denitrification in Constructed Free-Water Surface Wetlands: II. Effects of Vegetation and Temperature," *Ecological Engineering*, 14:17-32 (2000).

Barrett et al., "The Industrial Potential and Economic Viability of Spouted Bed Processes," Chemeca 85, paper D4c, The Thirteenth Australasian Conference on Chemical Engineering, Perth, Australia, pp. 401-405 (1985).

Bennett et al., "Design of a Software Application for the Simulation and Control of Continuous and Batch Crystallizer Circuits," *Advances in Engineering Software*, 33:365-374 (2002).

Berg, "The Development of the Controlled Buoyancy System for Installation of Submerged Pipelines," *Journal AWWA, Water Technology/Quality*, pp. 214-218 (1977).

Brandt et al., "Treatment Process for Waste Water Disposal of the "Morcinek" Mine Using Coalbed Methane," Conference on Coalbed Methane Utilization, Oct. 5-7, 1994.

Claflin et al., "The Use of Spouted Beds for the Heat Treatment of Grains," Chemeca 81, The 9th Australasian Conference on Chemical Engineering, Christchurch, New Zealand, 4:65-72 (1981).

Claflin, "Intraparticle Conduction Effects on the Temperature Profiles in Spouted Beds," Chemeca 85, paper D9b, The Thirteenth Australasian Conference on Chemical Engineering, Perth, Australia, pp. 471-475 (1985).

Cross et al., "Leachate Evaporation by Using Landfill Gas," Proceedings Sardinia 97, Sixth Landfill Symposium, S. Margherita di Pula, Cagliari, Italy, pp. 413-422 (1997).

Dunn, "Incineration's Role in Ultimate Disposal of Process Wastes," *Chemical Engineering, Deskbook Issue*, pp. 141-150 (1975).

Durkee et al., "Field Tests of Salt Recovery System for Spent Pickle Brine," *Journal of Food Service*, 38:507-511 (1973).

English language translation of an office action from Chilean Patent Application No. 237-2007.

English translation of Chinese First Office Action for Application No. 201080012067.7, dated Oct. 12, 2012.

English translation of Chinese Search Report for Application No. 201080012067.7, dated Sep. 12, 2012.

English-language translation of Hage, H., "The MeMon Experiment: A Step towards Large-Scale Processing of Manure," Applied Science, 4 (1988).

Etzensperger et al., "Phenol Degradation in a Three-Phase Biofilm Fluidized Sand Bed Reactor," *Bioprocess Engineering*, 4:175-181 (1989).

EVRAS—Evaporative Reduction and Solidification Systems; Brochure for Web. Believed to be publically available as early as Mar. 5, 2010.

Fan et al., "Some Remarks on Hydrodynamic Behavior of a Draft Tube Gas-Liquid-Solid Fluidized Bed," AIChE Symposium Series, No. 234(80):91-97 (1985).

Fox et al., "Control Mechanisms of Flulidized Solids Circulation Between Adjacent Vessels," *AIChE Journal*, 35(12):1933-1941 (1989).

Genck, "Guidelines for Crystallizer Selection and Operation," CEP, pp. 26-32 (2004). www.cepmagazine.org.

Hattori et al., "Fluid and Solids Flow Affecting the Solids Circulation Rate in Spouted Beds with a Draft Tube," *Journal of Chemical Engineering of Japan*, 37(9):1085-1091 (2004).

Hill et al., "Produced Water and Process heat Combined Provide Opportunities for Shell CO2"; EVRAS; Facilities 2000: Facilities Engineering in the Next Millennium.

Hocevar et al., "The Influence of Draft-Tube Pressure Pulsations on The Cavitation-Vortex Dynamics in a Francis Turbine," *Journal of Mechanical Engineering*, 49:484-498 (2003).

International Preliminary Report on Patentability and Written Opinion issued for International Patent application No. PCT/US2011/021811, dated Aug. 14, 2012.

International Preliminary Report on Patentability for Application No. PCT/US2007/001487, dated Jul. 21, 2009.

International Preliminary Report on Patentability for Application No. PCT/US2007/001632, dated Jul. 21, 2009.

International Preliminary Report on Patentability for Application No. PCT/US2007/001633, dated Jul. 21, 2009.

International Preliminary Report on Patentability for Application No. PCT/US2007/001634, dated Jul. 21, 2009.

International Preliminary Report on Patentability for Application No. PCT/US2008/056702, dated Sep. 15, 2009.

International Preliminary Report on Patentability for Application No. PCT/US2010/043647, dated Feb. 9, 2012.

International Preliminary Report on Patentability for Application No. PCT/US2010/043648, dated Feb. 9, 2012.

International Search Report and Written Opinion for Application No. PCT/US08/56702, dated Jun. 10, 2008.

International Search Report and Written Opinion for Application No. PCT/US10/043647, dated Apr. 27, 2011.

International Search Report and Written Opinion for Application No. PCT/US10/043648, dated Apr. 27, 2011.

International Search Report and Written Opinion for Application No. PCT/US2010/024143, dated Oct. 12, 2010.

International Search Report and Written Opinion for Application PCT/US2011/021811, dated Mar. 21, 2011.

International Search Report issued for International application No. PCT/US2012/021897, dated Oct. 8, 2012.

International Search Report issued in PCT/US2006/028515 mailed on Nov. 14, 2006.

Intevras Technologies, LLC—Innovative solutions for water purification, remediation and process improvement; Power Point Presentation, Oct. 2009.

Jones, "Liquid Circulation in a Draft-Tube Bubble Column," *Chemical Engineering Science*, 40(3):449-462 (1985).

Layne Evaporative Reduction and Solidification System Brochure (2010).

MikroPul, "Wet Scrubbers," (2009). www.mikropul.com.

Miyake et al., "Performance Characteristics of High Speed-Type Cross Flow Turbine," 83-0047:2575-2583 (1993).

Mueller et al., "Rotating Disk Looks Promising for Plant Wastes," (2007).

Mussatti, Daniel, Section 6, Particulate Matter Controls. Chapter 2 Wet Scrubbers for Particulate Matter. Innovative Strategies and Economics Group. Unisted States Environmental Protection Agency. Jul. 2002.

Office action from Chilean Patent Application No. 238-2007.

Office Action issued for U.S. Appl. No. 12/705,462, dated Nov. 6, 2012.

Office Action issued for U.S. Appl. No. 12/846,257, dated Nov. 16, 2012.

Padial et al., "Three-Dimensional Simulation of a Three-Phase Draft-Tube Bubble Column," *Chemical Engineering Science*, 55:3261-3273 (2000).

Rule 62 EPC Communication issued from the European Patent Office for Application No. 10741828.7, dated Jan. 31, 2013.

Rule 62 EPC Communication issued from the European Patent Office for Application No. 10805026.1, dated Feb. 27, 2013.

Rule 62 EPC Communication issued from the European Patent Office for Application No. 10805027.9, dated Feb. 5, 2013.

Sathyanarayana et al., Circular C.W. Intake System—A Research Opinion, Seventh Technical Conference of the British Pump Manufacturer's Association, paper 21, pp. 293-313, 1981.

Shaw LFG Specialties, LLC, 2006 Product Catalog.

Shimizu et al., "Filtration Characteristics of Hollow Fiber Microfiltration Membranes Used in Membrane Bioreactor for Domestic Wastewater Treatment," *Wat. Res.*, 30(10):2385-2392 (1996).

Smith, "Sludge-U-Like, as the Ban on Sea Disposal of Sewage Waste Looms, Technologies That Can Deliver Cleaner, Thicker and More Farmer-Friendly Sludges Are Gaining Popularity," *Water Bulletin*, 708 (1996).

St. Onge et al., "Start-Up, Testing, and Performance of the First Bulb-Type Hydroelectric Project in the U.S.A.," *IEEE Transactions on Power Apparatus Systems*, PAS-101(6):1313-1321 (1982).

Swaminathan et al., "Some Aerodynamic Aspects of Spouted Beds of Grains," Department of Chemical Engineering, McGill University, Montreal, Quebec, Canada, pp. 197-204 (2007).

(56) References Cited

OTHER PUBLICATIONS

Talbert et al., "The Elecrospouted Bed," *IEEE Transactions on Industry Applications*, vol. 1A-20, No. 5, pp. 1220-1223 (1984).
U.S. Office Action for U.S. Appl. No. 12/530,484, dated Apr. 16, 2013.
U.S. Office Action for U.S. Appl. No. 12/846,337, dated Apr. 17, 2013.
Williams et al., "Aspects of Submerged Combustion as a Heat Exchange Method," *Trans IChemE*, 71(A):308-309 (1993).
Written Opinion issued for International application No. PCT/US2012/021897, dated Sep. 28, 2012.
Written Opinion of the International Searching Authority for PCT/US2010/024143, dated Oct. 12, 2010.
Ye et al., "Removal and Distribution of Iron, Manganese, Cobalt, and Nickel Within a Pennsylvania Constructed Wetland Treating Coal Combustion By-Product Leachate," *J. Environ. Qual.*, 30:1464-1473 (2001).
Yeh et al., "Double-Pass Heat or Mass Transfer Through a Parallel-Plate Channel with Recycle," *International Journal of Hat and Mass Transfer*, 43:487-491 (2000).
Yoshino et al., "Removal and Recovery of Phosphate and Ammonium as Struvite from Supernatant in Anaerobic Digestion," *Water Science and Technology*, 48(1):171-178 (2003).
Alabovskij et al., "Concentration of Boiler Washing Water in Sub-merged-Combustion Devices," *Promyshl. Energet*, 4:38-39 (1975). English-language abstract only.
German Kurz, "Immersion Heater," OI U. Gasfeuerung, 18(3):171-180 (1973). English-language abstract only.
Schone, "Oil Removal from Exhaust Steam and Condensate of Piston-Powered Steam Engines," *Braunkohle*, 31:82-92 (1932). English-language abstract only.
Cherednichenko et al., "Disposal Of Saline Wastes From Petroleum Refineries, All-Union Scientific-Research and Planning-Design Institute of the Petroleum Refining and Petrochemical Industry," Khimiya I Tekhnologiya Topliv I Masel, 9:37-39 (1974). Translated.

Chinese Office Action for Application No. 201180014846.5, dated Jun. 18, 2013.
Final Office Action for U.S. Appl. No. 11/625,002, dated May 26, 2010.
Final Office Action for U.S. Appl. No. 11/625,022, dated Jan. 24, 2011.
Final Office Action for U.S. Appl. No. 11/625,024, dated Decemeber 8, 2010.
Gaudlip et al; "Marcellus Shale Water Management Challenges in Pennsylvania," SPE Shale Gas Production Conference, Fort Worth (2008).
International Preliminary Report on Patentability for Application No. PCT/US2006/015803, dated Nov. 13, 2007.
International Preliminary Report on Patentability for Application No. PCT/US2006/028515, dated Jan. 22, 2008.
International Preliminary Report on Patentability for Application No. PCT/US2012/021897, dated Jul. 23, 2013.
International Search Report and Written Opinion for Application No. PCT/US2006/015803, dated Oct. 30, 2007.
Notice of Allowance for U.S. Appl. No. 11/625,159, dated Jul. 9, 2010.
Office Action for U.S. Appl. No. 11/625,002, dated Jan. 6, 2010.
Office Action for U.S. Appl. No. 11/625,022, dated Jun. 22, 2010.
Office Action for U.S. Appl. No. 11/625,024, dated Jun. 18, 2010.
Office Action for U.S. Appl. No. 11/625,024, dated Nov. 27, 2009.
Office Action for U.S. Appl. No. 12/530,484, dated Apr. 16, 2013.
Office Action for U.S. Appl. No. 12/530,484, dated Feb. 29, 2012.
Office Action for U.S. Appl. No. 12/530,484, dated Oct. 17, 2012.
Office Action for U.S. Appl. No. 12/846,337, dated Apr. 17, 2013.
Screen shots from video on LFG website taken Jan. 18, 2011 (http://www.shawgrp.com/markets/envservices/envsolidwaste/swltg).
Search Report for Chinese Patent Application No. 201180014846.5, dated Jun. 8, 2013.
Shaw LFG Specialties, LCC "Waste Heat Leachate Evaporator System" (2011).

* cited by examiner

LIQUID CONCENTRATOR

CROSS-REFERENCE TO RELATED APPLICATIONS

Not applicable.

FIELD OF THE DISCLOSURE

The present application relates generally to liquid concentrators, such as wastewater concentrators, with improved features.

BACKGROUND

Wastewater comes in many forms and often needs to be treated by separating contaminants from water carrying the contaminants so that contaminants may be disposed of or further processed and contaminant-free water may be returned to other useful purposes or to the environment. Of course, such treatment is not limited to water, and as used herein, the term wastewater and water refers not only to water but to any liquid from which contaminants, such as dissolved salts, dissolved and/or suspended solids, volatile organic compounds, and so forth, need to be removed for various reasons.

A common way of separating the water from the contaminants is to evaporate some or all of the water from a stream or body of wastewater such that the water is separated in gaseous form from the contaminants. There are of course numerous ways to evaporate water from a standing body of wastewater, including the use of evaporation ponds, boiling, agitation of the wastewater, and so forth. Unfortunately, these methods often either take too long to evaporate the water, for example, when just sitting in an open containment pond, or they can require large amounts of applied energy, such as when fuel or electrical power is applied to cause boiling.

A leachate evaporation system 10 designed to avoid some of the drawbacks above is shown in FIG. 1. In this system, leachate from a landfill is injected at high pressure into a flowing stream of heated waste gas from a flare stack (not shown) as the gas is drawn under negative pressure created by induced draft fan 30 through a mixing chamber 12 of a wetted wall adjustable throat venturi evaporator. In the venturi evaporator, the heated waste gas and the leachate are drawn through a venturi 14, which has a restricted throat having a smaller cross-sectional area than the adjacent mixing chamber 12. The venturi 14 mixes and evaporates at least some of the water from the leachate into gaseous form. The mixed concentrated leachate and gases are then drawn together through a cyclonic entrainment separator assembly 16, which separates evaporated water and waste gas from unevaporated leachate and solids, exhausts the evaporated water and waste gas to the atmosphere, and collects the leachate and solids for further processing and/or disposal.

The cyclonic separator assembly 16 is in the form of a vertically oriented cylindrical vessel with four distinct regions: a lower separator chamber 18 into which the mixed leachate and gases are drawn, a sludge settling tank 20 disposed below the lower separator chamber, an upper separator chamber 22 immediately above the lower separator chamber, and an exhaust stack 24 exiting from above the upper separator chamber. The upper and lower separator chambers are separated by an inverted frustoconical divider 26 with a small central opening at the bottom thereof to allow separated leachate and solids to drip downwardly from the upper separator chamber to the lower separator chamber through the opening. The inverted frustoconical divider 26 also substantially obstructs flow of gases from the lower chamber upwardly into the upper chamber. Thus, a U-shape duct 28 with a first opening into the lower chamber and a second opening into the upper chamber allows the gases to flow from the lower chamber to the upper chamber around the inverted frustoconical divider. A fan 30 is disposed in the duct 28 to draw gases from the lower separator chamber 18 and push the gases into the upper separator chamber 22. An outlet from the venturi 14 and the ends of the U-shaped duct 28 each preferably opens through the side wall of the cyclonic separator in a tangential direction so as to promote cyclonic, i.e., spiral, flow of gases and suspended liquids and solids upwardly from the bottom of the lower separator portion up toward the top of the separator assembly.

The sludge settling tank 20 is partly separated from the lower chamber by a horizontal plate 32 that partially covers the sludge settling tank. Further a first vertical baffle 34 extends partway down from the horizontal plate toward the bottom of the sludge settling tank, and a second vertical baffle 36 laterally offset from the first baffle extends upwardly from the bottom of the sludge settling tank, thereby providing a tortuous up and down path for the leachate to pass from the lower portion of the separator to a recirculation line 38 that connects the sludge settling tank with a leachate delivery line 40. The sludge settling tank is effectively the very bottom end of the cylindrical vessel and has the same diameter as the lower separator chamber.

In use, the leachate and heated waste gas are brought together in the mixing chamber 12 immediately upstream of a venturi 14. As the heated waste gas and leachate move through the venturi, the increased velocity and corresponding drop in static pressure caused by the venturi causes the leachate to thoroughly mix with the heated gas and accelerates evaporation of water from the leachate into a gaseous state. Thereafter the mixed leachate and gases are drawn into the lower separator chamber of the cyclonic separator, and the cyclonic motion of the gas, leachate, and solids upwardly and around the cyclonic separator causes solids and suspended water droplets to fall out downwardly towards the sludge settling tank or collect on the peripheral wall of the vessel, while the gaseous water and waste gas move upwardly and are drawn by the fan through the U-shape duct into the upper separator chamber. In the upper separator chamber, further separation occurs due to continued cyclonic motion of the gases, and the gaseous water and waste gas are ejected through the exhaust opening. Any fluids and solids separated from the gases in the upper separator chamber fall by gravity down through the opening in the inverted frustoconical divider and drop to the sludge settling tank. In the sludge settling tank suspended solids settle towards the bottom of the tank while liquid leachate flows up and over the second baffle and out of the settling tank through the recirculation pipe back into the leachate supply line, to be injected again into the leachate evaporator system. Accumulated solids in the form of sludge may be removed through a sludge removal port near the bottom of the sludge settling tank.

There are several limitations to the design of this evaporator system. A first limitation is that the design elements required for optimizing the functioning of the cyclonic separator and the settling tank are not necessarily compatible in terms of integrating them into a single vertical cylindrical body. Specifically the diameters of the cyclonic separator chambers, the settling tank, and the exhaust stack have significant impacts on the performance of each, and the design parameters for each are independent in terms of what works best. Thus where high velocity of gases is desirable in the cyclonic separator portions in order to both separate the solids and liquids from the gases and also to prevent build up of scale and/or sludge inside the cyclonic separator, in the sludge settling tank, low velocity and quiescence are more desirable in order to promote settling and separation of solids from the liquid. Further, high rates of recirculation flow of liquids from the sludge settling tank necessary to adequately feed the mixing chamber in order to prevent troublesome spray drying of suspended or dissolved solids that would stick to and build up on the walls of equipment downstream are at odds with the need for quiescence to promote the settling of the solids from the liquids.

Another limitation is the relatively small opening in the inverted frustoconical baffle that separates the upper separator chamber from the lower separator chamber. This opening needs to be small enough to prevent significant recirculation of gas from the upper portion to the lower portion around the fan; however, the relatively small opening can be prone to blockage due to build of precipitated solids.

A further limitation is the use of relatively high pressure nozzles to spray leachate into the mixing chamber at elevated pressures, such as in the range of twenty to fifty psig, which may be highly susceptible to fouling and/or blockage by buildup of dried solids in the leachate. The risk of this occurring would increase as the concentration of leachate from the sludge settling tank 20 increases in the recirculation system, which imposes limits on the degree of concentration that can be attained and negatively impacts on the reason why evaporative treatment was chosen in the first place.

Further the entire system suffers from a maintenance stand point by being difficult to access and clean any accumulated solids, sludge, and/or scale from the interior of the cyclonic separator and the evaporator system as a whole.

Therefore the inventors of the concentrator systems disclosed herein have attempted to overcome or improve on one or more of these limitations of this evaporator system.

SUMMARY

In one aspect, a liquid concentrator including an evaporator section arranged to evaporate liquids from the wastewater and a cyclonic separator also includes a settling chamber disposed below the cyclonic separator for receiving the solids and liquids from the cyclonic separator, wherein the cyclonic separator has a first width adjacent the settling chamber, and the settling chamber has a second width larger than the first width.

In another aspect, a liquid concentrator includes an evaporator section and a cyclonic separator having a tubular body. An inlet into a lower portion of the tubular body is operatively connected with the evaporator section to receive mixed wastewater and gas from the evaporator section and arranged to centrifugally separate the gas from solids and the wastewater. An exhaust outlet arranged to exhaust the gas from the tubular body is disposed proximate a top of the tubular body. The tubular body is substantially unobstructed between the inlet and the exhaust outlet.

In a further aspect, a liquid concentrator including an evaporator section arranged to evaporate liquids from the wastewater also includes a cyclonic separator comprising a lower chamber with an inlet operatively connected to the evaporator section and an upper chamber having an exhaust outlet, wherein the lower chamber is hydraulically separated from the upper chamber and a duct is arranged to allow gas flow from the lower chamber to the upper chamber.

In an additional aspect, a liquid concentrator having an evaporator section and a cyclonic separator operatively connected with the evaporator section also includes a clean water injection port in at least one of the evaporator section and the cyclonic separator, wherein the clean water injection port is arranged to allow clean water to be injected there through to rinse the interior of the at least one of the evaporator and the cyclonic separator.

Other useful and beneficial aspects will become apparent upon review of the detailed description and the drawings.

DETAILED DESCRIPTION

Figure 1:
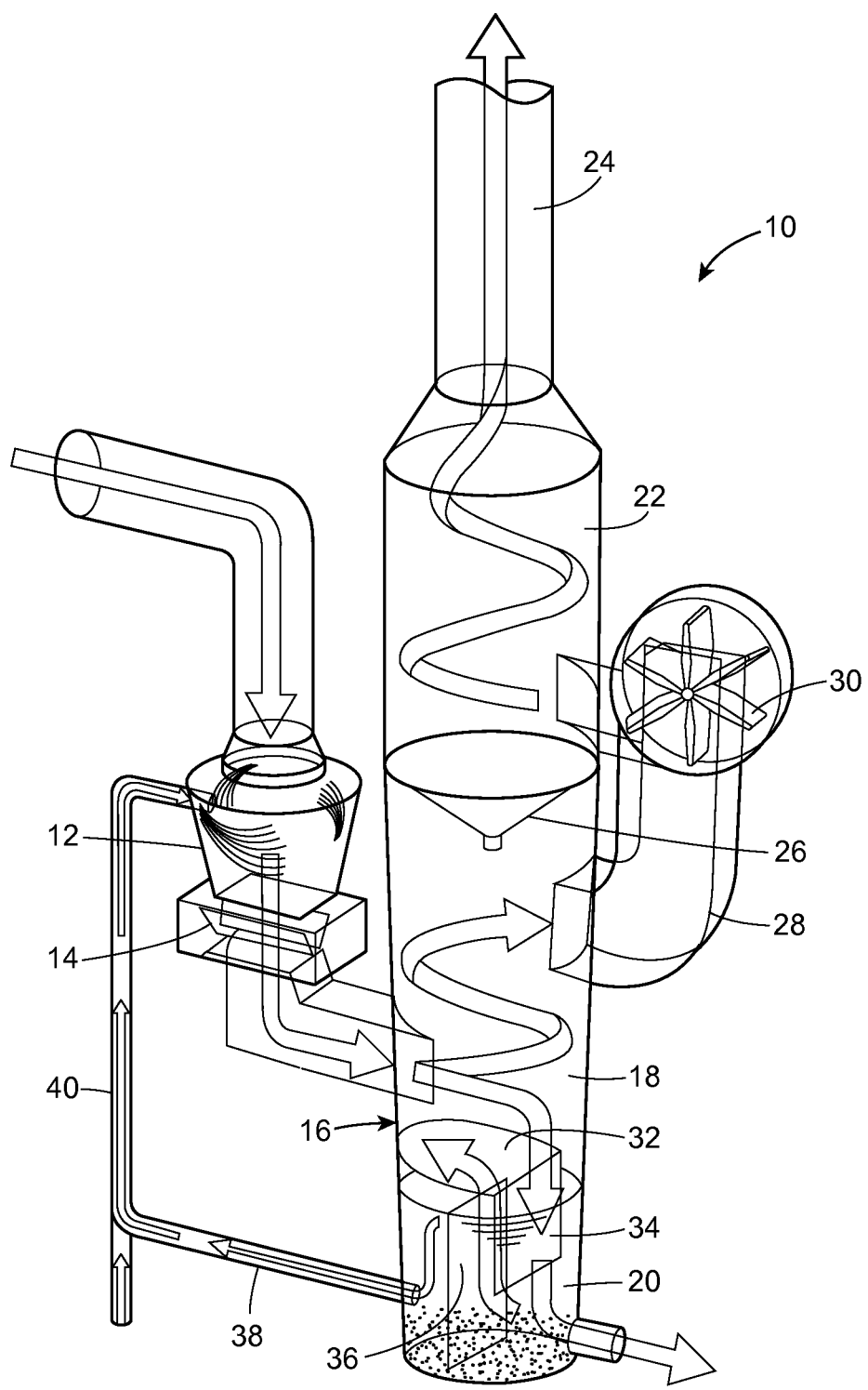
FIG. 1 is a schematic diagram of a known waste heat leachate evaporator system.
Figure 2:
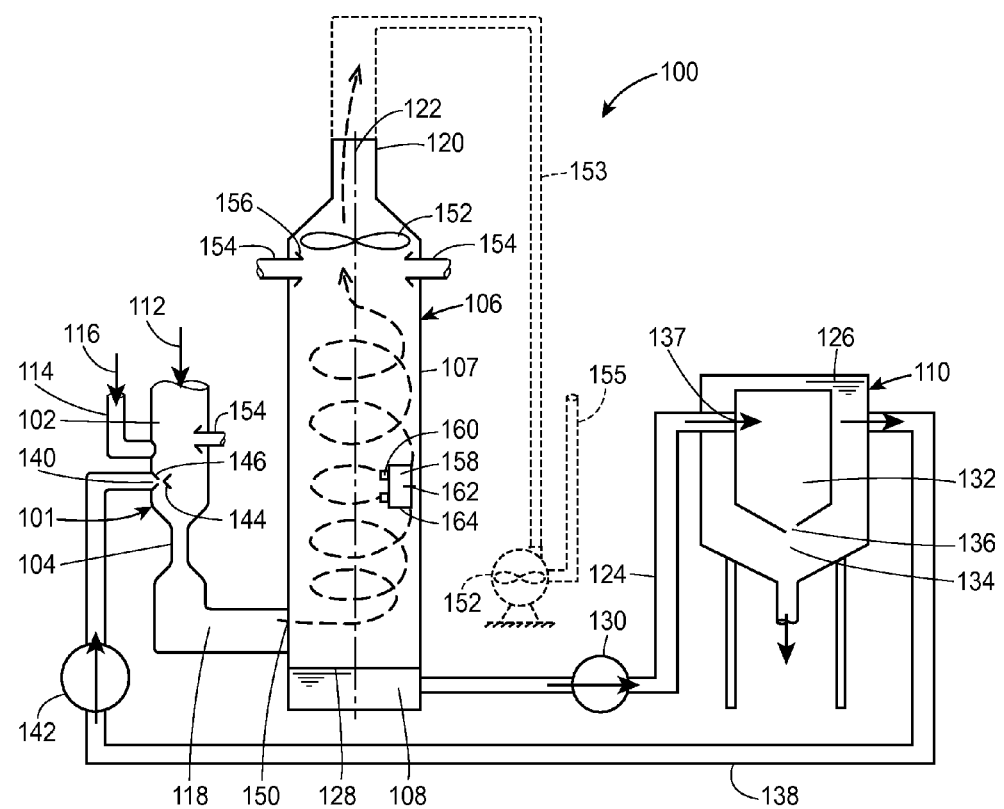
FIG. 2 is a schematic diagram of a liquid concentrator according to one aspect.

Turning now to FIG. 2, a liquid concentrator 100 includes an evaporator assembly 101, which in one form includes a mixing corridor having a mixing chamber 102 and an evaporator section 104, a cyclonic separator 106, a sump 108, and a settling chamber 110. The mixing chamber is connected to a source of gas, preferably heated gas, such as waste heat gas from a flare stack or exhaust from an internal combustion engine, turbine or any other suitable source of heated gases 112. A wastewater supply pipe 114 also opens into the mixing chamber 102 to supply wastewater 116 into the mixing chamber. The wastewater 116 initially mixes with gases 112 in the mixing chamber and then the mixture is drawn through the evaporator section 104 where the wastewater mixes more thoroughly with the gases and liquid from the wastewater evaporates into the gases.

The evaporator section 104 preferably includes a venturi evaporator, which includes a narrow venturi section through which the gases are accelerated and the corresponding static pressure drop induces the thorough mixing and rapid evaporation of the liquids from the wastewater. The evaporator section 104, however, may have other forms suitable for evaporating water or other liquids from the wastewater, including for example, open flames, a draft tubes, or static mixing devices. The mixed wastewater and gases from the evaporator section 104 are then transferred by a transfer conduit or duct 118, which preferably has a larger cross-sectional area than the venturi section, into the cyclonic separator 106.

The cyclonic separator 106 is arranged to separate liquids and solids from the gases that are received from the evaporator section 104 via the transfer duct 118 by both gravity fallout of solids and any suspended wastewater and also by centrifugal force of cyclonic motion of the gases through the cyclonic separator. The cyclonic motion forces wastewater and solids carried in the gases radially outwardly against the peripheral inner wall of the cyclonic separator, where they collect and run down the wall by the force of gravity. In a preferred arrangement the cyclonic separator 106 is in the form of a tubular vessel 107, such as a cylindrical tower, with its axis 122 arranged substantially vertically. In other aspects the tubular vessel 107 may be square or have other cross-sectional configurations, for example, hexagonal, octagonal, etc. Description as a tubular vessel 107 refers to the inner periphery of the vessel and not necessarily to exterior portions of the vessel, which may be any shape or form without affecting the functional tubularity of the interior of the vessel. Although the cyclonic separator 106 is preferably vertically oriented, it may be tilted out of vertical a few degrees one way or the other and still be substantially vertical. For the present description, an important aspect is that the cyclonic separator 106 be oriented vertically enough to allow wastewater and solids that are separated from the gases to drop by the force of gravity down to the sump 108 while the gases are ejected through the exhaust outlet 120 at an upper end of the vessel. The evaporator section 104 is operatively connected to a lower portion of the tubular vessel 107 by the transfer duct 118 or any effective means and may be directly connected to or directly exhaust into the cyclonic separator without an intervening duct portion. Preferably, the inlet of the transfer duct 118 into the cyclonic separator 106 is arranged to be tangential to the wall to promote spiral movement of the gases through the tubular vessel 107 as depicted in the drawings.

The sump 108 is disposed below the cyclonic separator 106 and in one embodiment as shown in FIG. 2 is formed by the bottom end of the tubular vessel 107. The sump 108 is arranged to collect the wastewater and solids that are separated from the gases and fall by gravity downwardly upon the interior wall of the tubular vessel 107. Some aspects the sump 108 may be partially separated from the remaining portions of the interior of the cyclonic separator 106 such as by baffles or duct or conduits as long as the sump is able to collect the wastewater and solids that fall by the force of gravity downwardly through the cyclonic separator 106.

The settling chamber 110 is separated from the sump 108 and is hydraulically connected to the sump so as to be able to receive solids and wastewater from the sump. The settling chamber 110 may be separated from the sump by any mechanism sufficient to cause fluid flow in the settling chamber to be relatively quiescent in relation to fluid flow in the sump 108. In a preferred arrangement as shown in FIG. 2 the settling chamber 110 is remote from the cyclonic separator 106 and hydraulically connected to the sump 108 by a conduit 124. Further the settling chamber 110 is preferably arranged to have a liquid head level 126 that is higher than a liquid head level 128 in the sump. For example, in one preferred arrangement the liquid head level 126 in the settling chamber 110 is designed to be approximately half-way up the height of the cyclonic separator 106, whereas the liquid head level 128 in the sump 108 is designed to be near the bottom of the cyclonic separator. In this arrangement, it is useful to have a pump 130 operatively disposed along the conduit 124, such as by being in-line with the conduit, in order to pump the wastewater and solids from the sump 108 up to the higher head level 126 in the settling chamber 110. The settling chamber 110 may take any form sufficient to allow quiescent settling of the solids from the wastewater. One preferred settling chamber design is an Imhoff tank, which is a known separator having two chambers, an upper chamber 132 and a lower chamber 134 and a restricted opening 136 between the upper chamber and the lower chamber. Preferably the upper chamber 132 and lower chamber 134 each has the form of a substantially cone-bottom tank, although many other forms and shapes of settling chambers would be capable of performing the same or similar functions. The conduit 124 is attached to a liquid inlet 137 into the settling chamber 110, which may be for example directly into the upper chamber 132 of the Imhoff tank. The settling chamber 110 may take other forms to achieve other desired design objectives. For example, in other arrangements, the Imhoff tank is replaced by an inclined plate separator or a simple single cone-bottom tank, depending on the characteristics the solids to be settled and the desired end result.

A recirculation conduit 138, such as a pipe or tube, is arranged to transfer wastewater from an upper portion of the settling chamber 110 back to the mixing chamber 102. The recirculation conduit 138 may have a separate liquid inlet 140 into the mixing chamber 102 and/or the conduit 138 may connect up with the wastewater supply conduit 114 thereby allowing the wastewater from the settling chamber 110 to mix with the wastewater 116 either prior to entering the mixing chamber 102 or in the mixing chamber 102. The liquid inlet 140 forms in one embodiment a low pressure injection port, which preferably injects the re-circulated wastewater into the mixing chamber 102 at a pressure of about 10 psig or less, more preferably about 5 psig or less, and most preferably at a pressure at about 2 psig. In a preferred arrangement, the liquid head level 126 of the settling chamber 110 is higher than the elevation of the liquid inlet 140 so that the re-circulated wastewater will travel through the conduit 138 back to the liquid inlet opening 140 under the force of gravity alone. However a pump 142 may be placed functionally in line with the conduit 138 to assist in moving the re-circulated wastewater from the settling tank 110 to the liquid inlet 140, in which case the liquid head level 126 of the settling chamber 110 may be disposed below the elevation of the liquid inlet 140. Other fluid transfer and pressure control devices may also be functionally disposed in the conduit 138 as necessary to achieve other design requirements. The low pressure injection port for liquid inlet 140 preferably does not include a spray nozzle and may include a baffle 144 to help deflect and/or otherwise disperse the flow of re-circulated wastewater from the liquid inlet to promote better and faster mixing of the re-circulated wastewater with the gases 112 in the mixing chamber 102. A spray nozzle 146 may, however, optionally be included over the liquid inlet 140 to further or alternatively promote mixing of the re-circulated wastewater with the gases 112.

The tubular vessel 107 is substantially unobstructed between inlet 150 of the duct 118 into lower portion of the tubular vessel and the exhaust outlet 120, which is preferably disposed at the very top end of the tubular vessel 107. By substantially unobstructed it is meant there are no significant obstruction such as baffles or venturi sections or other restrictions between the inlet 150 and the exhaust outlet 120 that would prevent gases from freely flowing from the inlet 150 to the exhaust outlet 120. There may, however, be various minor obstructions such as doorways, nozzles, and/or fans and still be substantially unobstructed, as long as the flow of gases from the inlet 150 to the exhaust outlet 120 is not significantly blocked by any structures on the interior of the cyclonic separator 106.

A fan 152 draws the gases from the inlet 150 upwardly toward the exhaust outlet 120 in any sufficient matter. In one arrangement, the fan 152 is disposed inside an upper portion of the tubular body as shown in FIG. 2. In another arrangement fan 152 may be disposed in the exhaust outlet 120. In a further embodiment shown in dashed lines in FIG. 2, the fan 152 is remote from the flow path of the gases through the liquid concentrator 100, such as being located outside of the cyclonic separator 106, and operatively connected with the interior of the cyclonic separator 106, for example, by a duct 153. Preferably, the duct 153 extends from the exhaust outlet 120 of cyclonic separator 106 to an inlet of the fan 152. The fan 152 draws hot gases and evaporated liquid from the exhaust outlet 120 and injects the hot exhaust gases and evaporated liquid into an exhaust duct 155, which discharges the hot gases and evaporated liquid to atmosphere or any desirable vapor treatment or vapor recovery system (neither shown). Additionally, the fan 152 in this embodiment preferably is not supported by the tubular vessel 107, and may be spatially separated from the tubular vessel. In one exemplary arrangement, the fan 152 is mounted on the ground or at grade level either adjacent to or spaced from the tubular vessel 107, and the duct 153 connects an inlet of the fan 152 with the exhaust outlet 120, which can eliminate any need for significant added structural supports for the fan 152 and/or vibration loads on the tubular vessel 107. Locating the fan 152 remote from the flow path of the gases and wastewater also minimizes the need for extended structural supports and simplifies installation and maintenance activities for the fan 152 thereby reducing first costs and maintenance expenses. Preferably, the outlet of the fan 152 is operatively connected with an interior of the cyclonic separator 106, for example by the duct 153, and the inlet of the fan draws air from an exterior of the cyclonic separator.

The liquid concentrator 100 may optionally include structures designed to help maintain the interior of the cyclonic separator 106 and/or the mixing corridor, clean and free from scale and/or sludge build up. For one maintenance feature, clean water injection ports 154 are disposed inside one or more of the mixing chamber 102 the evaporator section 104, the duct 118, and the cyclonic separator 106 to help wash the interior thereof. Preferably, each clean water injection port 154 has a nozzle 156 that is arranged to spray pressurized clean water against areas of the interior of the various structures that are prone to build up of scale and/or sludge.

Another maintenance feature adapted for allowing easy cleaning of the liquid concentrator 100 is a door 158 covering an opening into the cyclonic separator 106. The door 158 is attached to the cyclonic separator with one or more hinges 160 and includes a latch 162 for latching the door in a closed position covering the opening. The latch is preferably a quick release latch of any form readily known in the art. A seal 164 is arranged around the opening to form a seal between the door 158 and the vessel 107 when the door is closed. In a preferable arrangement, the door 158 is sized to receive a person easily therethrough, such as by being approximately two feet in diameter or square or any other shape and size designed to allow ready access of a person into the interior of the tubular vessel 107.

Figure 3:
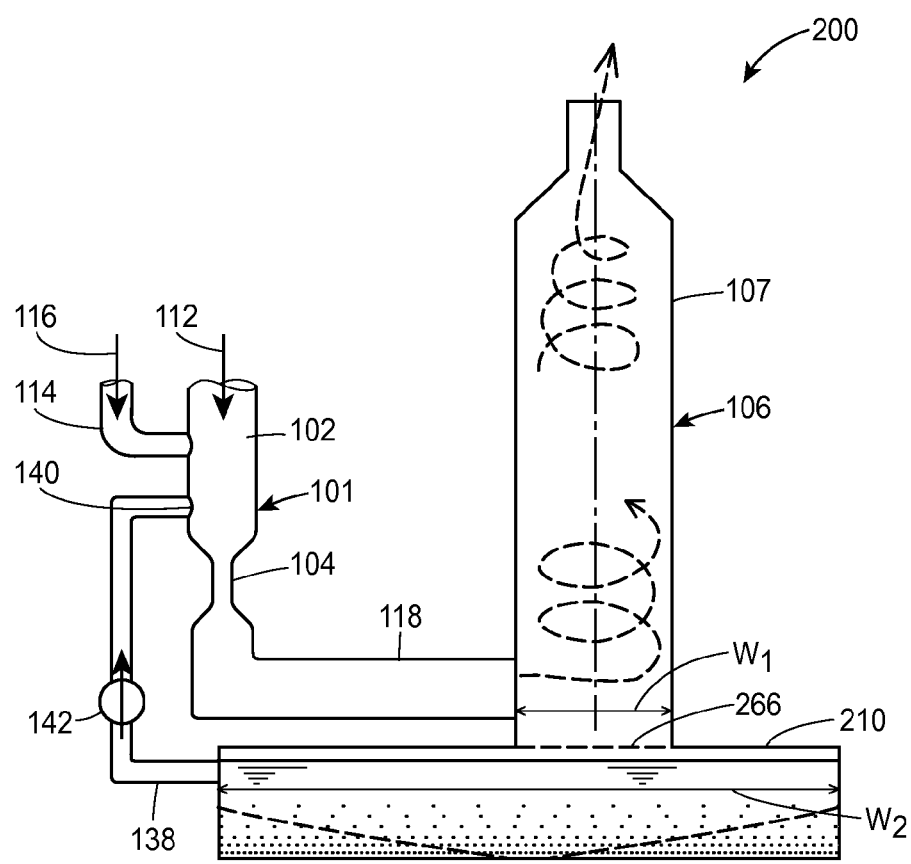
FIG. 3 is a schematic diagram of a liquid concentrator according to another aspect.

In FIG. 3, another liquid concentrator 200 is shown which includes additional aspects of the design that overcome some of the limitations with the prior art pointed out herein-above. The liquid concentrator 200 has many features that are substantially identical to the liquid concentrator 100 and therefore substantially similar or identical features are given the same reference numbers as given with liquid concentrator 100. The liquid concentrator 200 includes an evaporator assembly 101 with a mixing corridor having a mixing chamber 102 and an evaporator section 104. The mixing chamber 102 receives wastewater 116 via a wastewater feed conduit 114 and gas 112, such as heated waste gas from a flair stack or engine exhaust. The evaporator section 104 is connected with the mixing chamber 102 and is arranged to mix the wastewater with the gas and evaporate liquids from the wastewater. The evaporator section 104 is preferably a venturi evaporator as previously described herein. The evaporator section 104 is connected to the bottom of the cyclonic separator 106 by the duct 118. The duct 118 is connected to the cyclonic separator 106 by a port that is tangentially aligned so as to dispense the mixed wastewater and gases into the cyclonic separator, tangentially whereby the gases will travel through the cyclonic separator in a spiral or cyclonic path. Other portions of the cyclonic separator 106 are preferably substantially the same as previously described herein and will not be repeated for the sake of brevity.

Unlike the liquid concentrator 100, the liquid concentrator 200 includes a settling chamber 210 disposed directly beneath the bottom end of the tubular vessel 107 for receiving the solids and liquids that fall out of the gases in the cyclonic separator. In this design there is no separate sump between the tubular vessel 107 and the settling chamber 210. Rather the settling chamber 210 functions as both a sump and settling chamber in a single combined chamber.

An opening 266 at the bottom of the cyclonic separator 106 allows the solids and wastewater to fall by gravity from the interior the tubular vessel 107 into the settling chamber 210. The opening 266 has a width W1 adjacent the settling chamber 210 and the settling chamber 210 has a second width W2 adjacent the opening 266, wherein the width W2 is larger than the width W1. Having the width of the settling chamber W2 larger than the width W1 of the opening leading into the settling chamber allows both the high velocity movement of gases through the cyclonic separator 106, which promotes evaporation and helps prevent build up of solids therein, while simultaneously providing for more quiescent flow of the wastewater through the settling chamber 210 to allow the solids to settle to the bottom thereof as the wastewater is drawn toward recirculation conduit 138. In a preferred design, the cyclonic separator 106 has a cylindrical inner surface, the first width W1 comprises an inside diameter of the cyclonic separator, and the opening 266 corresponds to the inside diameter of the cyclonic separator. However, the opening 266 may be restricted or narrower than other portions of the interior of the cyclonic separator 106, such as with a peripheral ledge or collar. Further, baffles or grates (not shown) optionally are placed across the opening 266 to further separate the high velocity motion of the gases moving through the cyclonic separator 106 from the quiescent, lower-velocity motion of liquids through the settling chamber 210 to the recirculation conduit 138. The shape of the settling chamber can take various forms, such as rectangular, oval, circular, egg shaped, etc., and may have a flat bottom or may have a slanted bottom to direct settled solids and sludge toward a specific extraction point. In one preferred embodiment, the settling chamber 210 has a circular shape adjacent the opening 266 and the width W2 corresponds with an inside diameter of the settling chamber adjacent the opening 266. In another embodiment, the settling chamber 210 may be rectangular and the width W2 is an inside width across a rectangular shape. The particular shapes of the opening 266 between the interior of the cyclonic separator 106 and the settling chamber 210 may be varied as required to meet certain design requirements, such as available area and space for layout of the liquid concentrator 200. The use of a larger width W2 for the settling chamber 210 allows the velocity of movement of wastewater from the opening 266 towards the recirculation conduit 138 to be slower than if the settling chamber were simply the bottom end of the tubular vessel 107, thereby allowing or providing more opportunity for solids to settle to the bottom of the settling chamber.

Figure 4:
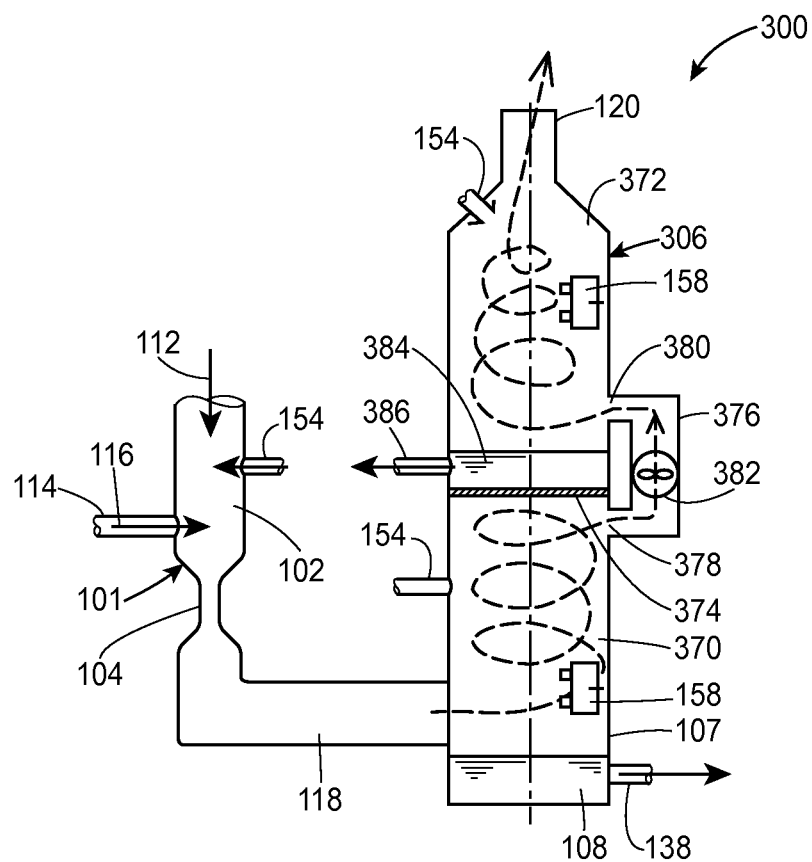
FIG. 4 is a schematic diagram of a liquid concentrator according to a further aspect.

FIG. 4 shows another liquid concentrator 300 with many identical or similar features to the liquid concentrators 100 and 200, which are numbered the same as previously. The liquid concentrator 300 includes an evaporator assembly 101 with a mixing corridor having a mixing chamber 102 and evaporator section 104 connected to the mixing chamber 102, and a transfer duct 118 that connects the mixing chamber 104 with a lower end of a cyclonic separator 306. Wastewater 116 is injected into the mixing chamber 102 with a wastewater supply conduit 114, and gas, such as heated waste gases 112, is supplied into the mixing chamber 102. The evaporator section 104 is preferably a venturi evaporator as previously described, whereby gas and wastewater are accelerated through the venturi and thoroughly mixed such that liquid from the wastewater is evaporated into the gases. The mixture of gases and wastewater are transferred via the transfer duct 118 into the cyclonic separator 306 where the gases and any suspended solids and wastewater travel cyclonically to separate the solids and wastewater from the gases in a manner generally similar to that previously described herein.

A significant difference between the liquid concentrator 300 and the liquid concentrators 100 and 200 is that the cyclonic separator 306 is separated into a lower chamber 370 and an upper chamber 372 by any suitable means, such as a divider 374 extended across a middle portion of the tubular vessel 107. The divider 374 prevents liquids and solids from falling from the upper chamber 372 down into the lower chamber 370 inside the cyclonic separator 306.

A duct 376 allows gas flow from the lower chamber 370 to the upper chamber 372 around the divider 374, whereby gas from the lower chamber can move from the lower chamber into to the upper chamber. Preferably the duct 376 as a first opening 378 through a sidewall of the tubular vessel 107 in the lower chamber 370, a second opening 380 through the sidewall of the tubular vessel into the upper chamber 372, and at least some curve on the exterior side of the cyclonic separator to connect the two openings. Thus, in one arrangement the duct 376 has a generally U-shaped configuration as shown in FIG. 4, which thereby allows gas to flow out of the lower chamber, up and around the divider 374, and back into the upper chamber. The duct 376 may alternatively be completely contained inside the tubular vessel 107, in which case the first and second openings 378, 380 through the sidewall of the tubular vessel 107 would be eliminated.

A fan 382 is preferably operatively in line with the duct 376 so as to draw the gases with a negative pressure from the transfer duct 118 into the lower chamber 370 and from there through the opening 378 into the duct 376. The fan 382 then pushes the air with positive pressure through the opening 380 into the upper chamber 372, and from the upper chamber out through the exhaust outlet 120 disposed at a top end of the cyclonic separator 306. In a preferred arrangement, the ducts 118 and 376 and the openings 378 and 380 are directed tangentially along an inner diameter of the cyclonic separator 306 in order to induce cyclonic motion of the gases through both the lower chamber 370 and the upper chamber 372. Preferably, the first opening 378 of the conduit 376 is disposed above the sump 108 toward an upper end of the lower chamber 370 and the second opening 380 of the conduit 376 is disposed above the second sump 384 nearer the lower end of the upper chamber 372. The opening 380 of the duct 376 is preferably located above a maximum operating level of liquid in the second sump 384.

The cyclonic separator 306 forms a first sump 108 at a bottom end of the lower chamber 370 and a second sump 384 at the bottom of the upper chamber 372, wherein the sumps 108 and 384 receive and collect wastewater and solids that separate out from the gases and fall downwardly as the gases move upwardly through the lower and upper chambers 370 and 372. Preferably, the cyclonic separator 306 is formed of the single cylindrical vessel 107 that is vertically oriented and defines both the upper chamber 372 and the lower chamber 370, and the divider 374 is formed of a solid plate occluding the entire cross-sectional area of the cyclonic separator 306, such as spanning the inner diameter of the cylindrical vessel 107. However the upper chamber 372 and lower chamber 370 need not be formed by a single cylindrical vessel and may be separated from each other, for example, by being spaced apart as first and second vessels that are connected by a suitable duct 376.

Recirculation conduits 138 and 386 are connected to the lower sump 108 and upper sump 384, respectively, to remove wastewater and/or sludge and collected solids therefrom. The recirculation conduits 138 and 386 may transfer the sludge and wastewater to any desired location for any desired purpose. In a preferred embodiment, the recirculation conduits 138 and 386 re-circulate the wastewater and sludge back to the mixing chamber 102 via, for example, the wastewater supply conduit 114, for recirculation through the liquid concentrator 300 and further removal of water and/or other liquids therefrom during the second and subsequent passes through the liquid concentrator. Additionally, the recirculation conduits 138 and 386 may be directed to other processing or waste removal equipment as desired.

The liquid concentrator 300 preferably includes cleaning and maintenance features, such as the clean water injection ports 154 directed into one or more of the upper chamber 372, the lower chamber 370, and the mixing chamber 154, and/or other portions of the liquid concentrator. The water injection port 154 may be used to inject clean water into the respective chambers to rinse the interior thereof as previously described herein. Further, one or more doors 158, as previously described herein, may be disposed over openings through the wall of the cyclonic separator 306 to provide access by a person therein to allow cleaning of the interior of the upper chamber and/or lower chamber and/or other portions of the liquid concentrator 300.

Figure 5:
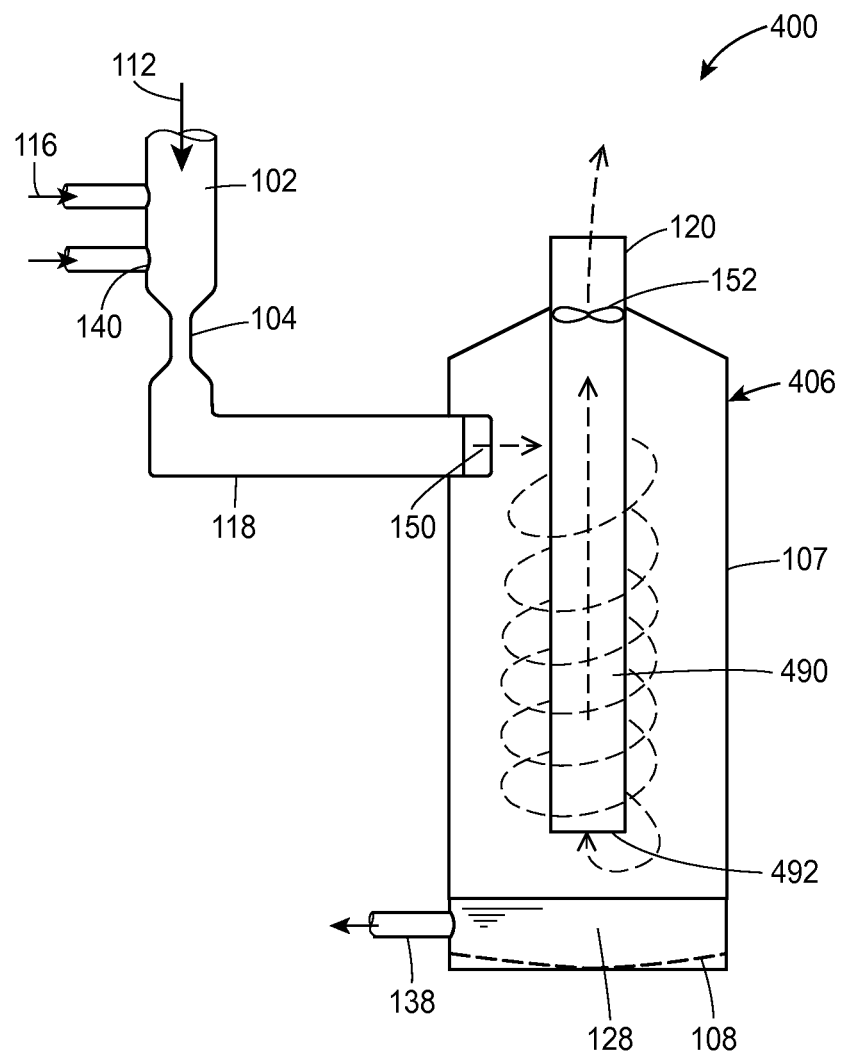
FIG. 5 is a schematic diagram of a liquid concentrator according to a still further aspect.

Turning to FIG. 5, another liquid concentrator 400 includes an evaporator section 104 and a cyclonic separator 406. The evaporator section 104 preferably has a venturi evaporator and other features the same as previously described herein. The cyclonic separator 406 is similar to the separator 106, except that the inlet 150 of the duct 118 is located near a top end of the vessel 107, and a dip pipe 490 extends down the center of the vessel 107 from the exhaust outlet 120 part way to the bottom of the vessel. In this way, the gases flow in the opposite vertical direction than in the separator 106, and the tubular vessel 107 is obstructed by the dip pipe 490 rather than being substantially unobstructed. The dip pipe 490 forms a conduit between the fan 152 and an open bottom end 492 of the dip pipe. The open bottom end 492 is located above the normal liquid level 128 held in the liquid/solid collection zone, such as the sump 108, at the bottom of the vessel 107. In this arrangement, droplet-laden gas enters the vessel 107 tangentially at the top, and the dip pipe 490 conducts the gas first downwardly through the vessel 107 around the dip pipe 490 to the open bottom end 492 of the dip pipe, and then upwardly through the dip pipe 490 to the fan 152, which is preferably located within the dip pipe, and subsequently out the exhaust outlet 120. In this design, the liquid concentrator 400 in some arrangements can be more compact, i.e., shorter and/or smaller diameter, than the liquid concentrator 100, 200, or 300 for a given efficiency as the downward motion of the gas pushes liquid that impinges on the wall downward into the collection sump rather than pushing against the force of gravity when the gas flows upward over the liquid film, as in the separator 106. The liquid concentrator may include any sump, settling chambers, and/or recirculation system as previously described herein, or that may otherwise be effective for performing such functions. For example, the bottom of the vessel 107 in the sump area 108 can function as a settling tank that has a larger diameter than the body of the vessel 107 and may be equipped with a cone bottom.

While the liquid concentrators 100, 200, 300, and 400 have been disclosed primarily as using venturi evaporators, the evaporator sections are not limited necessarily to using a venturi to evaporate liquids out of the wastewater. Rather the evaporator section may include additional and/or alternative mechanisms for promoting evaporation of the liquids out of the wastewater, such as with direct flame injection ports, heat transfer panels, draft tubes, static mixers, etc. In fact although the mixing corridor is generally described with a continuous gas phase being merged with a discontinuous liquid phase, i.e. droplets of water being injected into a large stream of gases, the mixing corridor and evaporator section may alternatively include a discontinuous gas phase merged with a continuous liquid phase, i.e. injection of gas bubbles into a large volume of liquid such as with a draft tube assembly. Thus, many of the features disclosed in the liquid concentrators 100, 200, 300, and 400 are not necessarily dependent upon the particular type of evaporator or evaporative machinery.

While certain representative embodiments and details have been shown for purposes of illustrating the invention, it will be apparent to those skilled in the art that various changes in the methods and apparatus disclosed herein may be made without departing from the scope of the invention.

I claim:

1. A liquid concentrator comprising:
   an evaporator assembly comprising a mixing chamber arranged to mix wastewater with gas and evaporate liquids from the wastewater, a wastewater inlet operatively arranged to supply wastewater to the mixing chamber, and a gas inlet operatively arranged to supply a flow of gas the mixing chamber; and
   a cyclonic separator comprising a tubular body having an inlet into a lower portion, the inlet operatively connected with the evaporator assembly to receive the mixed wastewater and gas and the lower portion arranged to centrifugally separate the gas from solids and the wastewater, an exhaust outlet proximate to a top of the tubular body arranged to exhaust the gas from the tubular body, and a fan arranged to draw the mixed wastewater and gas into the lower portion;
   wherein the tubular body is substantially unobstructed between the inlet and the exhaust outlet.

2. The liquid concentrator of claim 1, wherein the fan is disposed inside an upper portion of the tubular body.

3. The liquid concentrator of claim 1, wherein the fan is disposed in the exhaust outlet.

4. The liquid concentrator of claim 1, wherein the fan is located outside of the cyclonic separator, an outlet of the fan is operatively connected with an interior of the cyclonic separator by a duct, and an inlet of the fan draws air from an exterior of the cyclonic separator.

5. The liquid concentrator of claim 1, wherein the tubular body has a straight axis oriented substantially vertically.

6. The liquid concentrator of claim 1, wherein the evaporator assembly comprises a mixing chamber arranged to receive the wastewater and gas and an evaporator section connected with the mixing chamber.

7. The liquid concentrator of claim 1, wherein the evaporator assembly comprises a venturi evaporator.

8. The liquid concentrator of claim 1, comprising a sump disposed below the inlet in the lower portion of the tubular body, the sump arranged to collect wastewater and solids separated from the gas, and a recirculation conduit connecting the sump and the evaporator assembly, wherein the recirculation conduit transports wastewater from the sump to the evaporator assembly.

9. The liquid concentrator of claim 1, further comprising:
   a clean water injection port arranged to spray clean water against an interior surface of the tubular body of the cyclonic separator, wherein clean water injected through the water injection port washes the interior surface to prevent build up of scale and/or sludge on the thereon.

10. A liquid concentrator comprising:
    an evaporator assembly arranged to mix wastewater with gas and evaporate liquids from the wastewater, a wastewater inlet operatively arranged to supply wastewater to the evaporator assembly, and a gas inlet operatively arranged to supply a flow of gas the evaporator assembly;
    a cyclonic separator comprising a body that is vertically oriented, wherein the body defines a lower chamber and an upper chamber disposed directly above the upper chamber, the lower chamber having an inlet operatively connected to the evaporator assembly to receive the mixed wastewater and gas and to separate the gas from solids and the wastewater, the upper chamber having an exhaust outlet arranged to exhaust the gas, a fan arranged to draw the mixed wastewater and gas into the lower chamber, and a divider wall that extends across the tubular body, wherein the divider wall hydraulically separates the upper chamber from the lower chamber to prevent liquids and solids from falling from the upper chamber down into the lower chamber; and
    a duct arranged to allow gas flow from the lower chamber to the upper chamber.

11. The liquid concentrator of claim 10, further comprising a first sump disposed at the bottom of the lower chamber and a second sump disposed at the bottom of the upper chamber.

12. The liquid concentrator of claim 11, wherein the body of the cyclonic separator comprises a tubular body.

13. The liquid concentrator of claim 12, wherein the duct has a first end that opens into the lower chamber, a second end that opens into the upper chamber, and at least one curved section between the first and second ends that extends around the divider wall.

14. The liquid concentrator of claim 13, wherein the duct has a substantially U-shaped axis located on an exterior side of the tubular body.

15. The liquid concentrator of claim 13, wherein the first end of the duct is disposed above the first sump and the second end of the duct is disposed above the second sump.

* * * * *

UNITED STATES PATENT AND TRADEMARK OFFICE
CERTIFICATE OF CORRECTION

Page 1 of 1

PATENT NO. : 8,741,101 B2
APPLICATION NO. : 13/548866
DATED : June 3, 2014
INVENTOR(S) : Bernard F. Duesel, Jr.

It is certified that error appears in the above-identified patent and that said Letters Patent is hereby corrected as shown below:

In the Claims:

At Column 11, line 33, "gas the" should be -- gas to the --.

At Column 12, line 22, "gas the" should be -- gas to the --.

Signed and Sealed this
Fifteenth Day of December, 2015

Michelle K. Lee
*Director of the United States Patent and Trademark Office*